United States Patent
Jang et al.

(10) Patent No.: US 11,134,247 B2
(45) Date of Patent: Sep. 28, 2021

(54) IMAGE ENCODING AND DECODING METHOD AND APPARATUS THEREFOR

(71) Applicant: LG ELECTRONICS INC., Seoul (KR)

(72) Inventors: Hyeongmoon Jang, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/341,002

(22) PCT Filed: Sep. 29, 2017

(86) PCT No.: PCT/KR2017/010959
§ 371 (c)(1),
(2) Date: Apr. 10, 2019

(87) PCT Pub. No.: WO2018/070723
PCT Pub. Date: Apr. 19, 2018

(65) Prior Publication Data
US 2019/0320170 A1     Oct. 17, 2019

Related U.S. Application Data

(60) Provisional application No. 62/406,903, filed on Oct. 11, 2016.

(51) Int. Cl.
*H04N 19/117*    (2014.01)
*H04N 19/182*    (2014.01)
*H04N 19/70*     (2014.01)

(52) U.S. Cl.
CPC ......... *H04N 19/117* (2014.11); *H04N 19/182* (2014.11); *H04N 19/70* (2014.11)

(58) Field of Classification Search
None
See application file for complete search history.

(56) References Cited

U.S. PATENT DOCUMENTS

2015/0103900 A1\*   4/2015   Liu ................... H04N 19/154
                                                 375/240.12

FOREIGN PATENT DOCUMENTS

| KR | 10-2015-0016064 A | 2/2015 |
| KR | 10-2015-0097367 A | 8/2015 |
| KR | 10-2016-0009061 A | 1/2016 |
| KR | 10-2016-0019531 A | 2/2016 |
| KR | 10-2016-0114087 A | 10/2016 |

\* cited by examiner

*Primary Examiner* — Mikhail Itskovich
(74) *Attorney, Agent, or Firm* — Dentons US LLP

(57) ABSTRACT

Disclosed in the present invention are an image processing method and an apparatus therefor. Specifically, the image processing method can comprise the steps of: extracting encoded image data from a bitstream received from an encoder; decoding the encoded image data so as to generate a reconstructed image; determining a category of a current pixel by comparing a pixel value of the current pixel in the reconstructed image with pixel values of neighboring pixels of the current pixel; generating an offset applied to the current pixel on the basis of a difference value between pixel values of pixels, determined according to the category, among the neighboring pixels and the pixel value of the current pixel; and compensating for the current pixel by adding the offset to the pixel value of the current pixel.

9 Claims, 18 Drawing Sheets

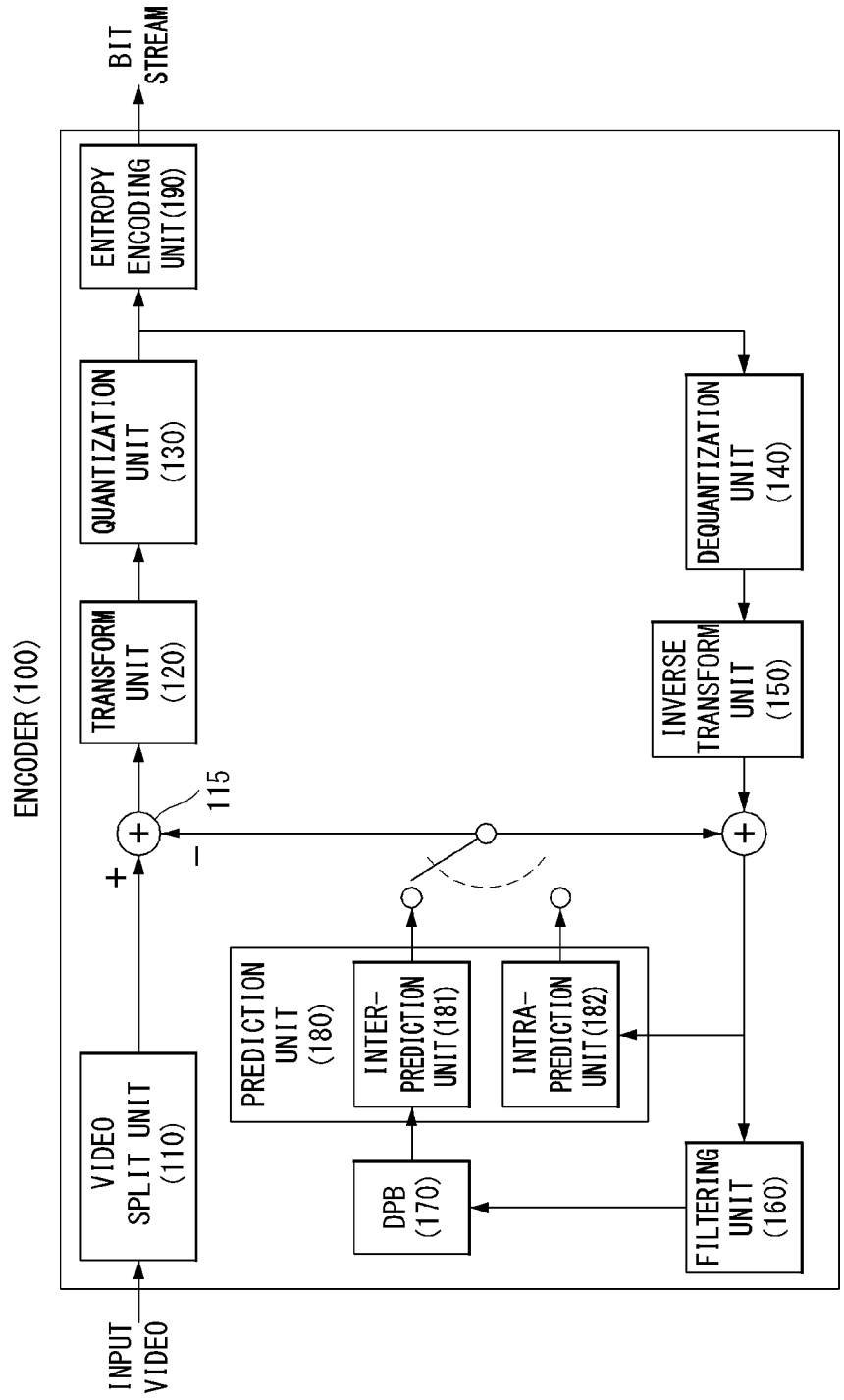
[Fig. 1]

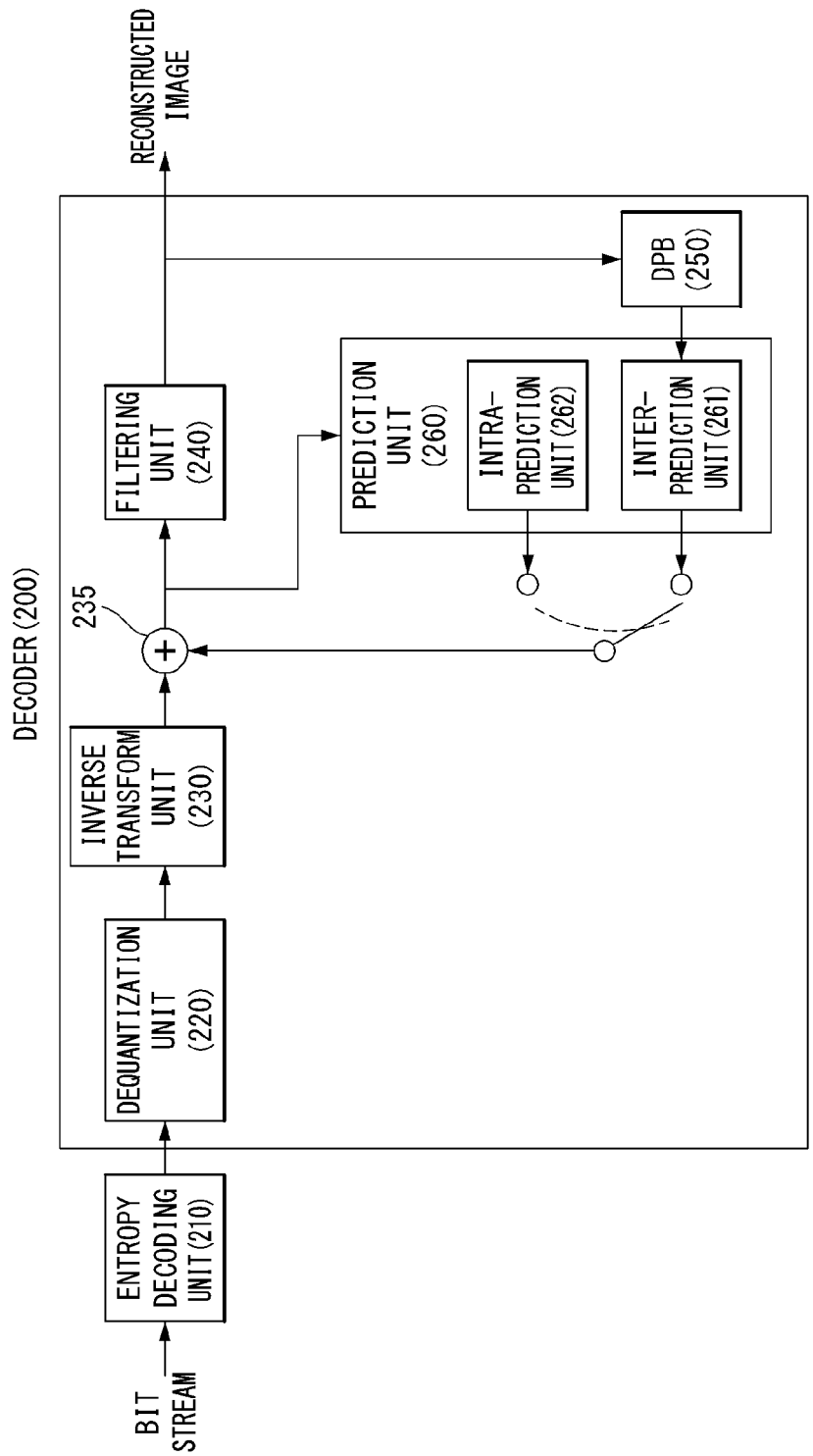
[Fig. 2]

[Fig. 3]
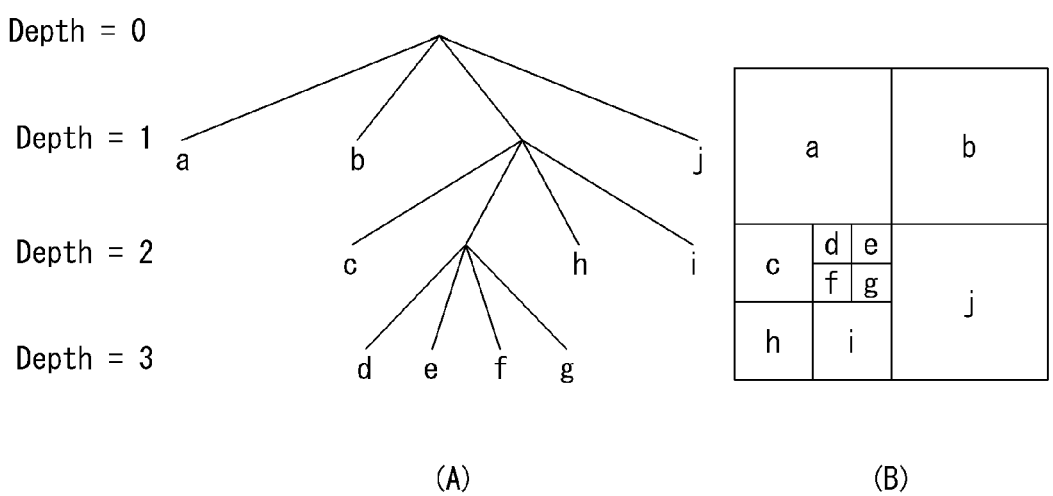

[Fig. 4]
Intra:
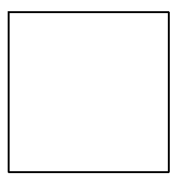
2Nx2N
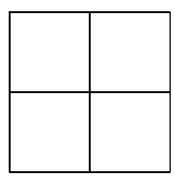
NxN
Inter:
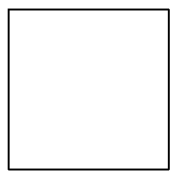
2Nx2N
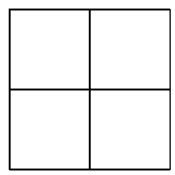
NxN
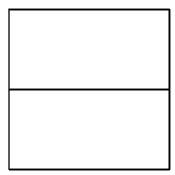
2NxN
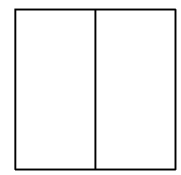
Nx2N
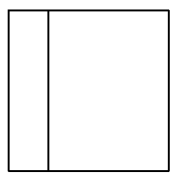
nLx2N
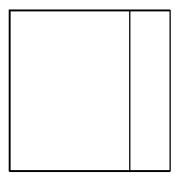
nRx2N
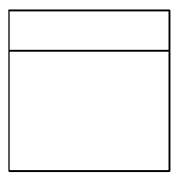
2NxnU
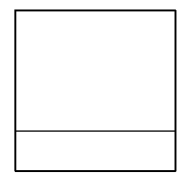
2NxnD 【Fig. 5】

| A SAO off | B SAO on | C SAO on | D SAO off |
| E SAO off | F SAO on | G SAO on | H SAO on |
| I SAO on | J SAO off | K SAO on | L SAO off |

[Fig. 6]
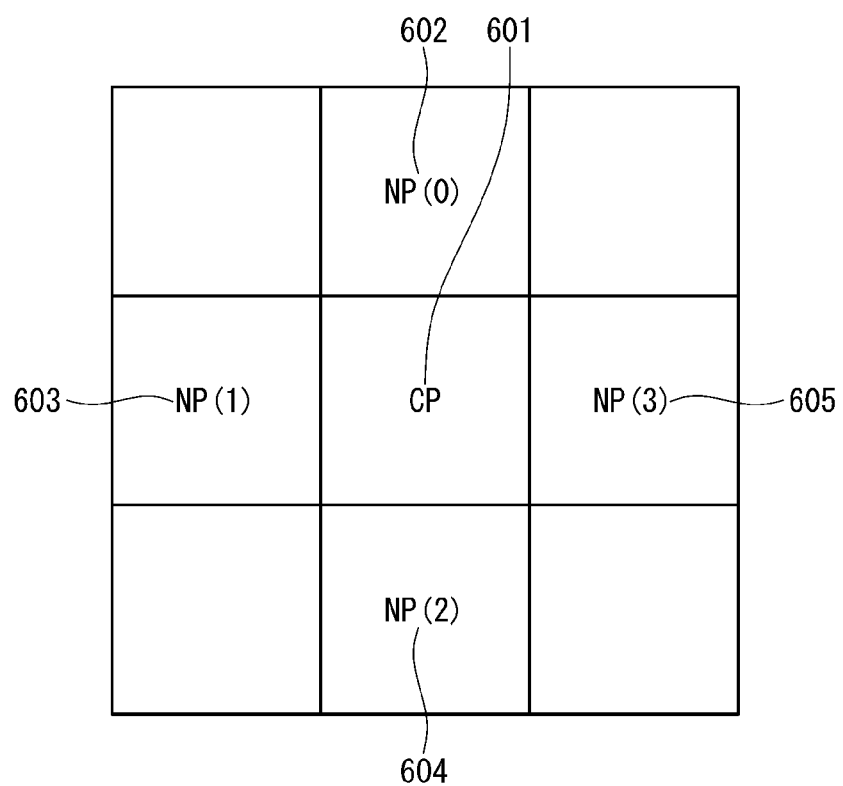

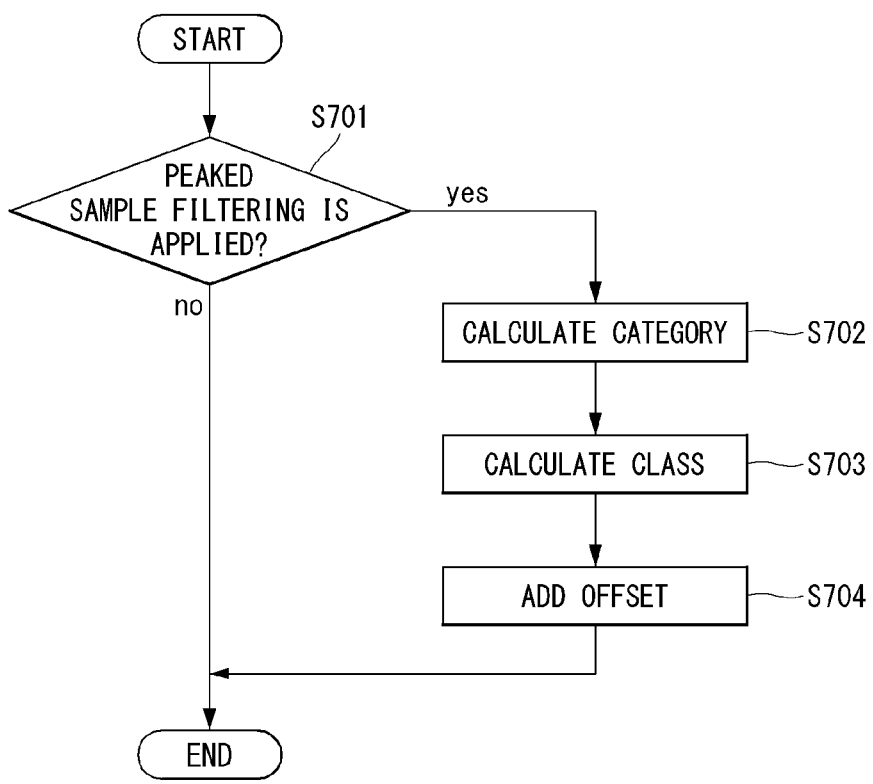
[Fig. 7]

[Fig. 8]
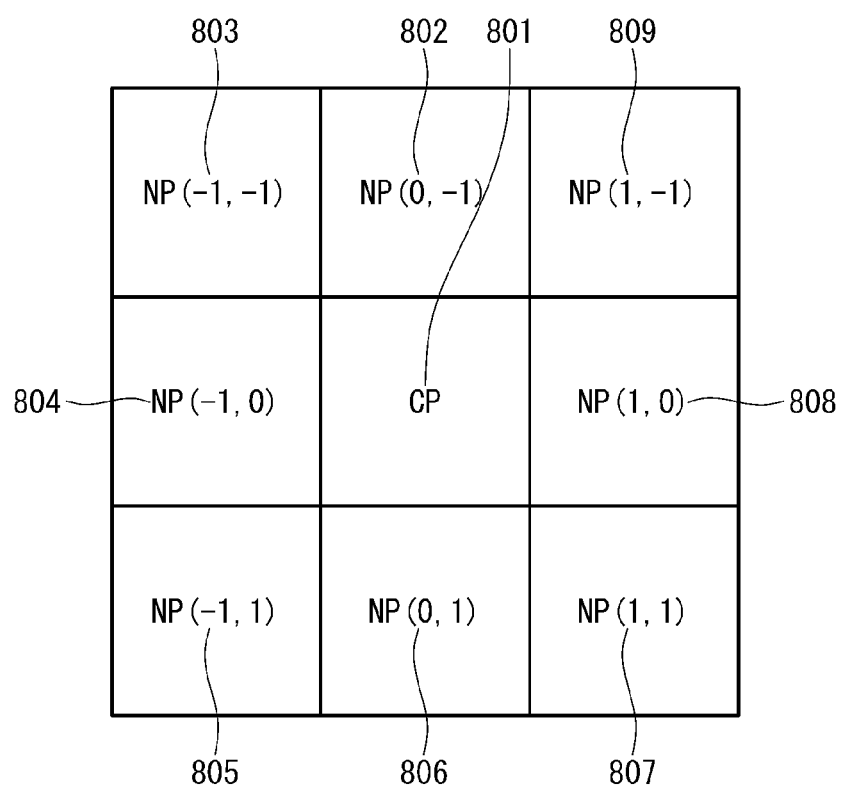

[Fig. 9a]
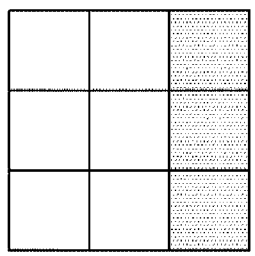 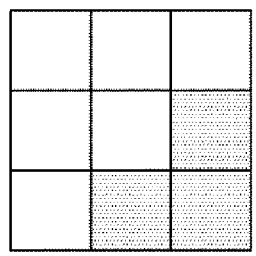 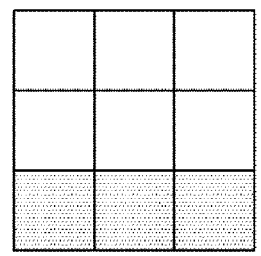
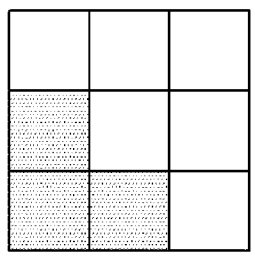 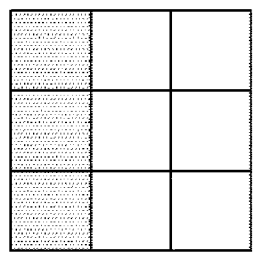 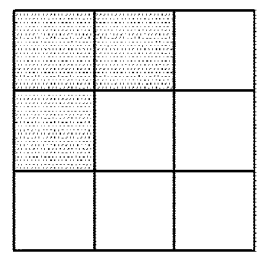
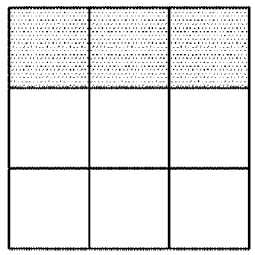 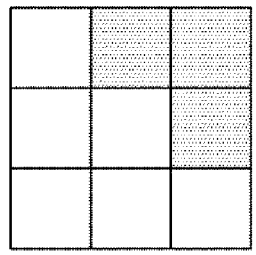
 NP DIFFERENT FROM CP
 NP THE SAME AS CP
Category. 1

【Fig. 9b】
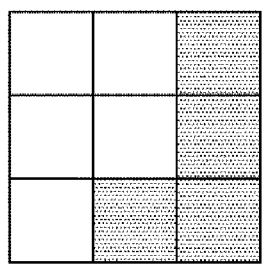 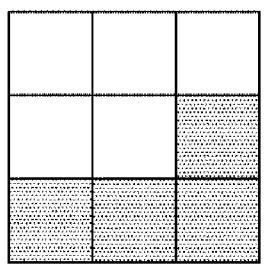 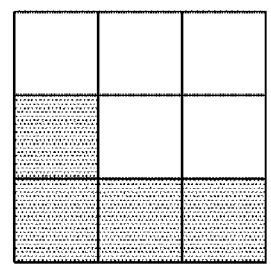
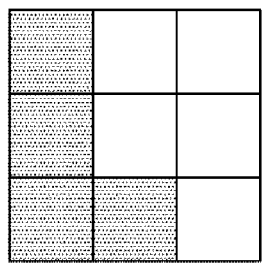 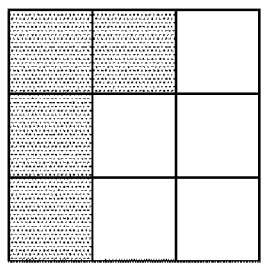 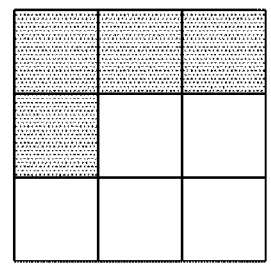
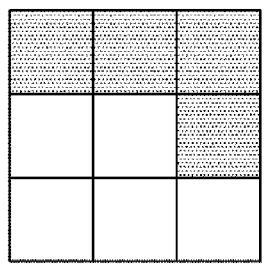 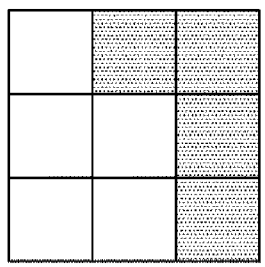
Category. 2

【Fig. 9c】
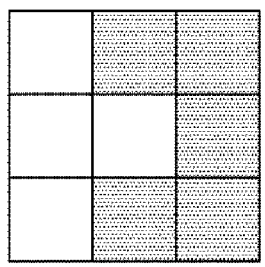 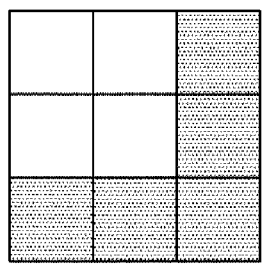 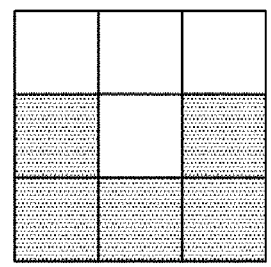
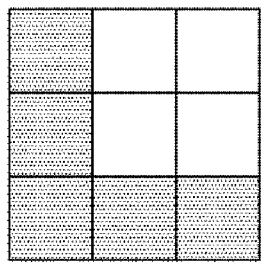 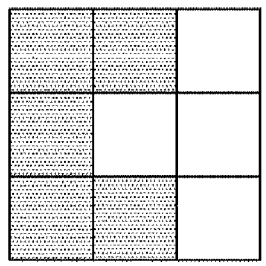 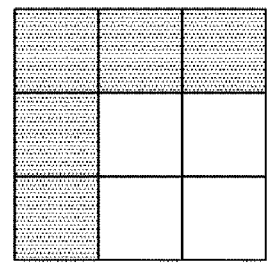
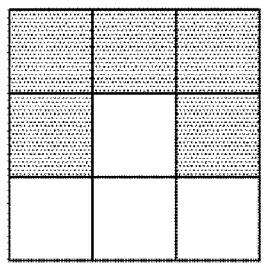 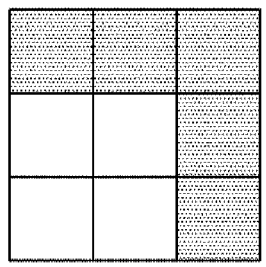    Category. 3

【Fig. 9d】
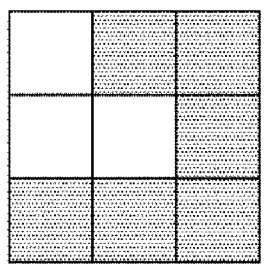
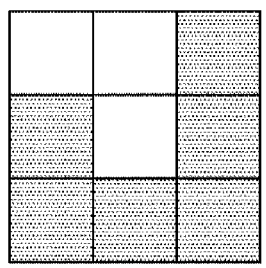
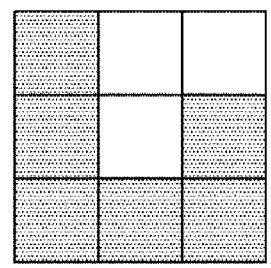
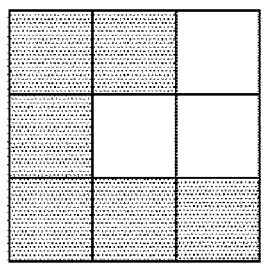
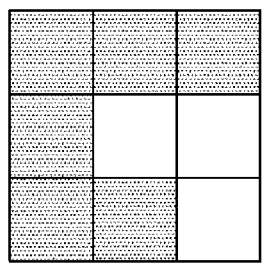
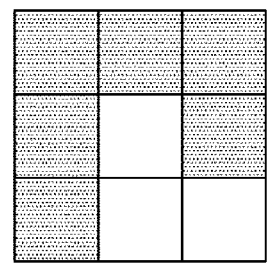
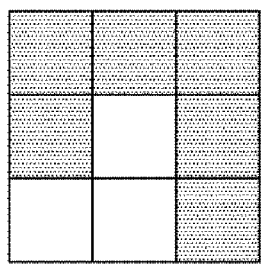
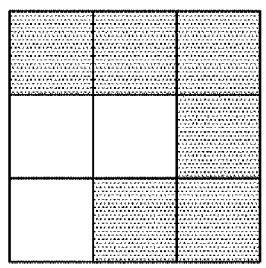
Category. 4

[Fig. 9e]
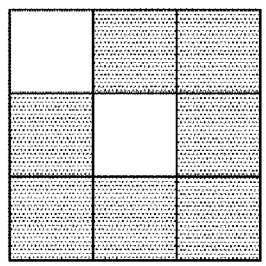
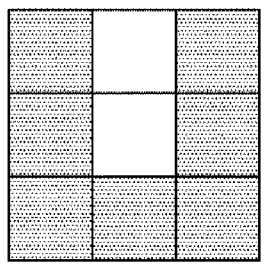
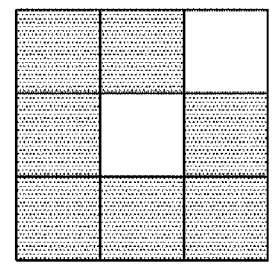
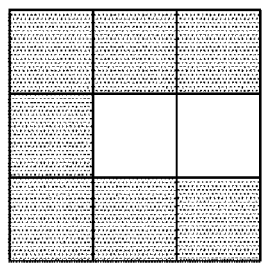
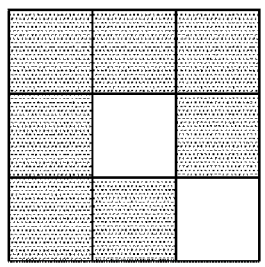
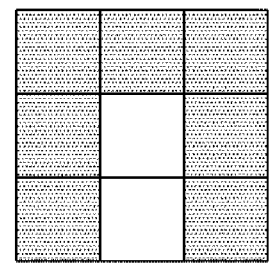
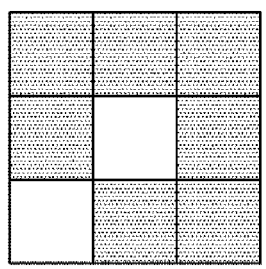
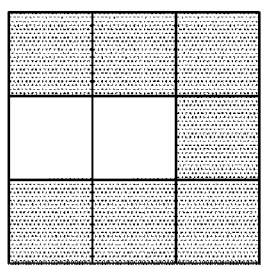
Category. 5

[Fig. 9f]
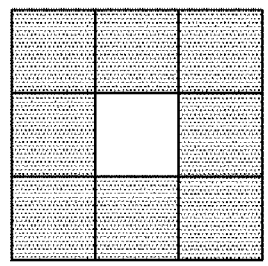 Category. 6

[Fig. 10]

|  |  |  |
|---|---|---|
| LA | A | RA |
| a | c | b |
| LB | B | RB |

(a)

|  |  |  |
|---|---|---|
| LA | a | RA |
| L | c | R |
| LB | b | RB |

(b)

|  |  |  |
|---|---|---|
| a | A | RA |
| L | c | R |
| LB | B | b |

(c)

|  |  |  |
|---|---|---|
| LA | A | a |
| L | c | R |
| b | B | RB |

(d)

[Fig. 11]
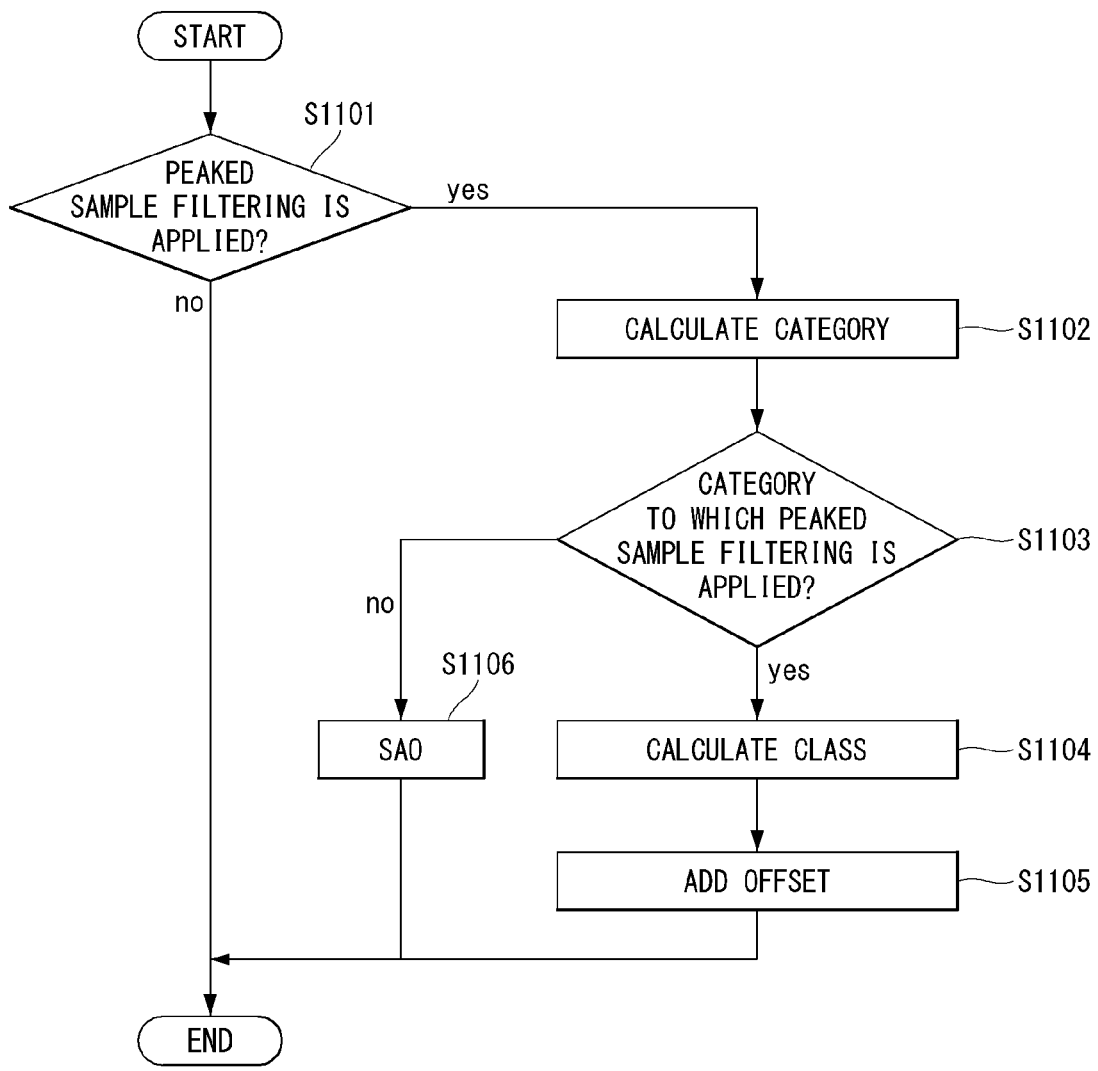

[Fig. 12]
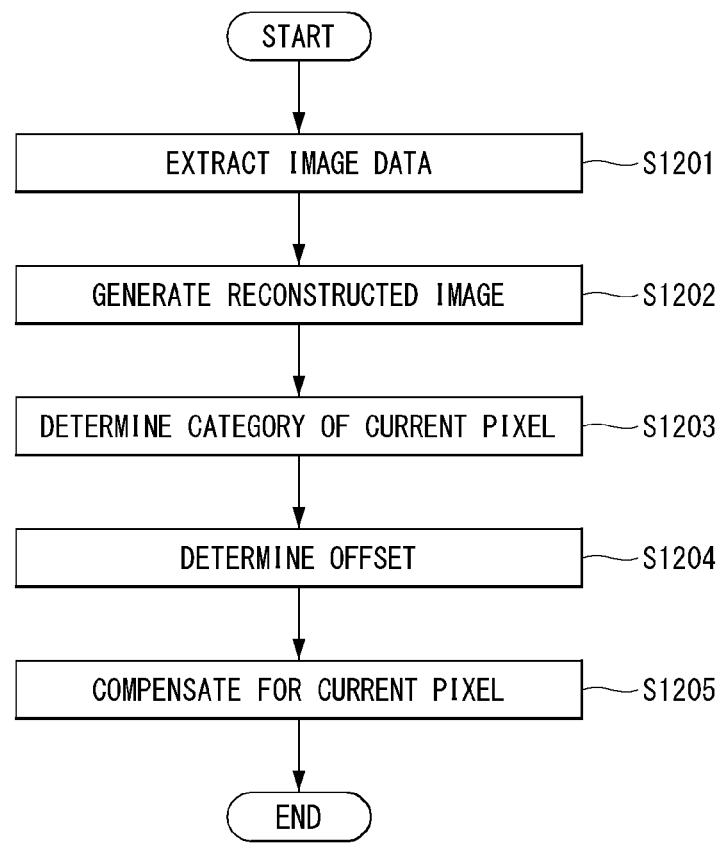

[Fig. 13]
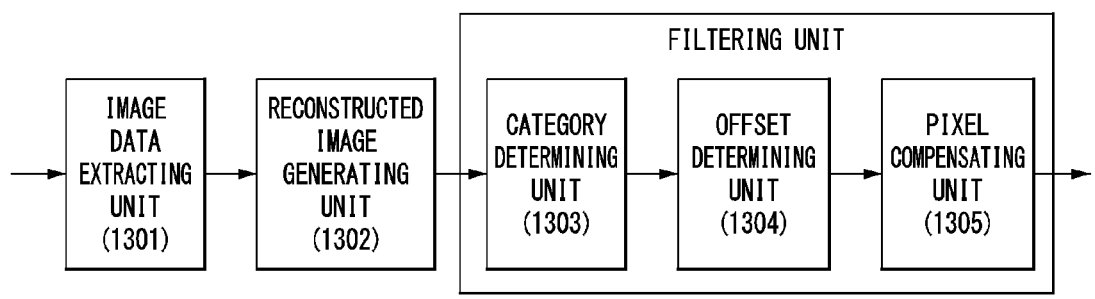

IMAGE ENCODING AND DECODING METHOD AND APPARATUS THEREFOR

CROSS-REFERENCE TO RELATED APPLICATIONS

This application is the National Stage filing under 35 U.S.C. 371 of International Application No. PCT/KR2017/010959, filed on Sep. 29, 2017, which claims the benefit of U.S. Provisional Applications No. 62/406,903, filed on Oct. 11, 2016, the contents of which are all hereby incorporated by reference herein in their entirety.

TECHNICAL FIELD

The present invention relates to a video processing method, and more particularly, to a method of filtering a peaked sample in a reconstructed image and a device supporting the same.

BACKGROUND ART

Compression encoding means a series of signal processing techniques for transmitting digitized information through a communication line or techniques for storing information in a form suitable for a storage medium. The medium including a picture, an image, audio, etc. May be a target for compression encoding, and particularly, a technique for performing compression encoding on a picture is referred to as video compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An embodiment of the present invention provides a method of smoothing a peaked sample to compensate for loss of information caused due to lossy compression such as quantization.

Another embodiment of the present invention provides a method of filtering a peaked sample using a neighboring sample.

Another embodiment of the present invention provides a method of deriving an offset used for filtering a peaked sample.

Technical problems to be solved by the present invention are not limited by the above-mentioned technical problems, and other technical problems which are not mentioned above may be clearly understood from the following description by those skilled in the art to which the present invention pertains.

Technical Solution

In an aspect of the present invention, a method for processing an image includes: extracting encoded image data from a bit stream received from an encoder; decoding the encoded image data to generate a reconstructed image; determine a category of the current pixel by comparing a pixel value of a current pixel in the reconstructed image with magnitudes of pixel values of neighboring pixels of the current pixel; determining an offset to be applied to the current pixel on the basis of difference values between pixel values of pixels determined according to the category, among the neighboring pixels, and the pixel value of the current pixel; and compensating for the current pixel by adding the offset to the pixel value of the current pixel.

Preferably, in the determining of a category, the category of the current pixel may be determined using the number of neighboring pixels having a pixel value greater than the current pixel or the number of neighboring pixels having a pixel value smaller than the current pixel.

Preferably, the neighboring pixels of the current pixel may include at least one of pixels adjacent to the left side, upper side, right side, or lower side of the current pixel.

Preferably, the neighboring pixels of the current pixel may include at least one of the left side, upper side, right side, lower side, upper left side, lower left side, lower right side, or upper right side of the current pixel.

Preferably, the method may further include: parsing a corresponding offset for each class of the category from the bit stream, wherein the category includes a plurality of classes.

Preferably, the determining of an offset may include: calculating a class index indicating a specific class in the category of the current pixel using the sum of difference values between pixel values of pixels determined according to the category and the pixel value of the current pixel; and determining an offset corresponding to a class identified by the class index, as an offset to be applied to the current pixel.

Preferably, the determining of an offset may further include: performing normalization on the class index on the basis of a normalization parameter received from the encoder.

Preferably, the normalization parameter may be transmitted in a slice header, a picture parameter set (PPS), a sequence parameter set (SPS), or a video parameter set (VPS).

Preferably, the determining of an offset may include determining an offset to be applied to the current pixel using an average of the difference values between the pixel values of the pixels determined according to the category and the pixel value of the current pixel.

Preferably, the method may further include: performing sample adaptive offset (SAO) on the current pixel when the category of the current pixel is included in a group to which the SAO is applied.

In another aspect of the present invention, a device for processing an image includes: an image data extracting unit extracting encoded image data from a bit stream received from an encoder; a reconstructed image generating unit decoding the encoded image data to generate a reconstructed image; a category determining unit determining a category of the current pixel by comparing a pixel value of a current pixel in the reconstructed image with magnitudes of pixel values of neighboring pixels of the current pixel; an offset determining unit determining an offset to be applied to the current pixel on the basis of difference values between pixel values of pixels determined according to the category, among the neighboring pixels, and the pixel value of the current pixel; and a pixel compensating unit compensating for the current pixel adding the offset to the pixel value of the current pixel.

Advantageous Effects

According to the embodiment of the present invention, since filtering is adaptively applied in consideration of a peaked sample in a reconstructed image, quality of the reconstructed image may be enhanced and compression efficiency may be increased.

Further, according to the embodiment of the present invention, by deriving an offset used for filtering a peaked sample in the decoder, signaling overhead may be reduced and compression performance may be resultantly enhanced.

Effects obtainable from the present invention are not limited by the effects mentioned above, and other effects which are not mentioned above may be clearly understood from the following description by those skilled in the art to which the present invention pertains.

DESCRIPTION OF DRAWINGS

The accompanying drawings, that are included to provide a further understanding of the invention and are incorporated in and constitute a part of the present specification, illustrate embodiments of the invention and together with the description serve to explain various principles of the invention.

FIG. 1 illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 illustrates a case where a sample adaptive offset is transmitted in a unit of a coding tree unit, as an embodiment to which the present invention is applied.

FIG. 6 is a view illustrating neighboring pixels used for performing filtering, as an embodiment to which the present invention is applied.

FIG. 7 is a flowchart illustrating a method of performing filtering on a peaked sample, as an embodiment to which the present invention is applied.

FIG. 8 is a view illustrating neighboring pixels used for performing filtering, as an embodiment to which the present invention is applied.

FIG. 9 is a view illustrating a method of determining a category using neighboring samples, as an embodiment to which the present invention is applied.

FIG. 10 is a view illustrating a class of an edge offset, as an embodiment to which the present invention is applied.

FIG. 11 is a flowchart illustrating a method of performing filtering on a peaked sample, as an embodiment to which the present invention is applied.

FIG. 12 is a view illustrating an image processing method according to an embodiment of the present invention.

FIG. 13 is a view illustrating an image processing device according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details to provide complete understanding of the present invention. However, it is understood by those skilled in the art that the present invention may be embodied without the particular details.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in the present invention, "block" or "unit" refers to a unit of performing an encoding/decoding process such as prediction, transform and/or quantization and may include multi-dimensional arrangement of samples (or pixels).

Further, "block" or "unit" may refer to multi-dimensional arrangement of samples with respect to a luma component or multi-dimensional arrangement of samples with respect to a chroma component. In addition, "block" or "unit" may commonly refer to including both multi-dimensional arrangement of samples with respect to a luma component and multi-dimensional arrangement of samples with respect to a chroma component.

For example, "block" or "unit" may be interpreted as the meaning including all of a coding block (CB) which refers to arrangement of samples to be subjected to encoding/decoding, a coding tree block (CTB) consisting of a plurality of coding blocks, a prediction block (PB) (or prediction unit (PU)) which refers to arrangement of samples to which the same prediction is applied, and a transform block (TB) (or transform unit (TU)) which refers to arrangement of samples to which the same transform is applied.

Further, "block" or "unit" may be interpreted as the meaning including a syntax structure used in a process of encoding/decoding arrangement of samples with respect to a luma component and/or a chroma component unless otherwise stated in the present invention. Here, the syntax structure refers to 0 or more syntax elements present in a bitstream in a specific order, and the syntax element refers to a data element represented in a bitstream.

For example, "block" or "unit" may be interpreted as the meaning including all of a coding unit (CU) including a coding block (CB) and a syntax structure used for encoding of the coding block (CB), a coding tree unit (CTU) consisting of a plurality of coding units, a prediction unit (PU) including a prediction block (PB) and a syntax structure used for prediction of the prediction block (PB), and a transform unit (TU) including a transform block (TB) and a syntax structure used for transform of the transform block (TB).

In addition, in the present invention, "block" or "unit" is not limited to arrangement of samples (or pixels) of a square or rectangular shape and may refer to arrangement of samples (or pixels) of a polygonal shape with three or more vertexes. In this case, "block" or "unit" may be referred to as a polygon block or a polygon unit.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more block.

The subtractor 115 generates a residual signal (or residual block) by subtracting a predicted signal (or predicted block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal (or reconstructed block) may be generated by adding the reconstructed residual signal to the prediction signal output by the inter-prediction unit 181 or the intra-prediction unit 182.

Meanwhile, during such a compression process, neighboring blocks are quantized by different quantization parameters. Accordingly, an artifact in which a block boundary is illustrated may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality may be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Furthermore, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 illustrated in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Block Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and l have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

In-Loop Filtering

The filtering unit (160 in FIG. 1, 240 in FIG. 2) may perform deblocking filtering to remove blocking artifacts and apply a sample adaptive offset (SAO) for compensating for loss of information caused due to lossy compression such as quantization, or the like. Accordingly, compression efficiency, as well as subjective image quality, may be enhanced.

In HEVC, an in-loop deblocking filter similar to H.264/AVC is used. In HEVC, various blocks such as CU, PU, and TU are defined, and thus, various block boundaries exist. In HEVC, deblocking filtering is applied by integrating all these boundaries except for a boundary between 4×4 blocks. Whether to apply deblocking (on/off) is determined for each boundary and strong filtering/weak filtering is determined for each boundary. This may be determined based on a gradient between bidirectional pixel values with respect to the boundary and a quantization parameter (QP) of a block.

SAO has been newly introduced in HEVC. In SAO, pixels are classified into different categories and an offset value is added to each pixel (i.e., each pixel in a picture to which the deblocking filter is applied) based on the categories.

Here, the encoder calculates an offset value for correcting an error between a reconstructed image and an original image, and transmits the offset value to the decoder. In this case, if the offset value is transmitted for each pixel, signaling overhead for offset transmission is increased, and thus, in HEVC, the offset value is transmitted for each CTU unit. That is, in HEVC, SAO is performed in CTU units.

In HEVC, the encoder may determine whether to use SAO, whether to apply an edge offset (EO), and whether to apply a band offset (BO) in consideration of characteristics of pixels in a current CTU, and transmit the same to the decoder for each CTU.

The BO is used for correcting an error regarding a specific brightness value band, and the EO is used when correcting an error of a pixel in a specific edge direction.

If the EO is used in the CTU, information indicating which class is used in the corresponding CTU is further transmitted to the decoder. Here, the class refers to four types of one-dimensional three pixel patterns for classifying pixels based on an edge direction of each pixel. A total of four types of patterns (classes) such as a pattern (horizontal class) of {(x−1, y), (x,y), (x+1, y)}, a pattern (vertical class) of {(x, y−1), (x,y), (x, y+1)}, a pattern (45° class) of {(x−1, y+1), (x,y), (x+1, y−1)}, and a pattern (135° class) of {(x−1, y−1), (x,y), (x+1, y+1)} are used. That is, the encoder determines whether which of the four types of classes are used when performance of EO is maximized in each CTU to determine a specific class and transmits determined class information to the decoder.

The encoder/decoder calculates a category on a pixel-by-pixel basis using the corresponding pixel value and neighboring pixel values for each pixel to be filtered in the corresponding CTU. Here, as described above, neighboring pixels used in calculating the category are determined according to the class of the CTU. Each pixel may be classified into a first category (if the current pixel value is greater than two neighboring pixel values), a second category (if the current pixel value is smaller than two neighboring pixel values), a third category (if the current pixel value is the same as a value of any one of two neighboring pixels), and a fourth category (remnant).

The encoder determines an offset value for each category and sends the determined offset value to the decoder. The decoder calculates the category for each pixel and adds the offset value received from the encoder corresponding to the category to the corresponding reconstructed pixel, thereby completing performing of SAO.

When BO is used in the CTU, the encoder classifies all the pixels in the CTU into multiple bands according to pixel values. If an input image has an 8-bit depth, an intensity range is divided into 32 equal intervals (i.e., bands) from 0 to a maximum intensity of 255. In this case, each band has a width of 8 pixels.

The encoder transmits the offset value to the decoder for four consecutive bands out of 32 bands. Here, the encoder also transmits information regarding a start position of a band in which the band offset is transmitted together to the decoder.

The decoder maps each pixel in the CTU to a band to which the pixel value belongs, and then adds a band offset value corresponding to the mapped band. Here, in a band in which the offset value is not transmitted, the offset value is regarded as 0.

As described above, distortion between the original image and the reconstructed image that occurs through the encoding process such as quantization, or the like, is compensated through the offset in units of pixels (sample), thereby improving subjective image quality and coding efficiency.

FIG. 5 illustrates a case where a sample adaptive offset is transmitted in coding tree units, as an embodiment to which the present invention is applied.

Referring to FIG. 5, it may be determined whether SAO is applied (SAO on) or SAO is not applied (SAO off) in coding tree units (CTU).

That is, the SAO value (e.g., SAO absolute value and the sign of SAO) may be signaled from the encoder to the decoder in CTU units to which SAO is applied.

The present invention proposes a method of smoothing a peaked sample to compensate for loss of information caused due to lossy compression such as quantization.

Embodiment 1

In an embodiment of the present invention, the encoder/decoder may perform filtering (or smoothing) by adding an offset to the peaked sample (or peaked pixel). Specifically, the encoder/decoder may determine a category of a current pixel using a difference value between the four neighboring pixels and the current pixel and adding an offset to the current pixel based on the determined category. The category may be classified on the basis of the degree of peak of pixels.

FIG. 6 is a view illustrating neighboring pixels used for performing filtering according to an embodiment to which the present invention is applied.

The encoder/decoder may calculate a category of a current pixel 601 using an upper neighboring pixel NP (0) 602, a left neighboring pixel NP (1) 603, a lower neighboring pixel NP (2) 604, and a right neighboring pixel NP (3) 605. The category of the current pixel 601 may be calculated.

For example, the encoder/decoder may calculate the category of the current pixel 601 using Equation (1) below.

$$\text{if } \Sigma_{x=0}^{3}(CP>NP(x)) \text{ equal to 3 then Category 1}$$

$$\text{if } \Sigma_{x=0}^{3}(CP<NP(x)) \text{ equal to 3 then Category 1}$$

$$\text{if } \Sigma_{x=0}^{3}(CP>NP(x)) \text{ equal to 4 then Category 2}$$

$$\text{if } \Sigma_{x=0}^{3}(CP<NP(x)) \text{ equal to 4 then Category 2} \quad \text{[Equation 1]}$$

Referring to Equation (1), if there are three neighboring pixels having a smaller pixel value than the current pixel 601 or if there are three neighboring pixels having a larger pixel value than the current pixel 601, the current pixel 601 may be determined as category 1. Also, if all four neighboring pixels are smaller than the current pixel 601 or greater than the current pixel 601, the current pixel 601 may be determined to be category 2. Otherwise, the current pixel may be determined as category 3.

In one embodiment of the present invention, when the current pixel corresponds to category 1 or category 2, the encoder/decoder may perform filtering on the current pixel by adding an offset to the pixel value of the current pixel.

In addition, the encoder/decoder may calculate a class of the current pixel using Equation 2 below.

$$\text{index} = \frac{\sum_{x=0}^{n-1}(\text{abs}(NP(x)-CP))/n}{2^{(\text{Normalization Factor})}} \quad \text{[Equation 2]}$$

Here, n denotes the number of selected neighboring pixels. That is, when calculating an index of a class, the encoder/decoder may use a neighboring pixel selected according to a certain criterion among four neighboring pixels. For example, the selected neighboring pixel may be a neighboring pixel used in category determination according to Equation 1. In the case of category 1 where there are three neighboring pixels smaller than the current pixel, the selected neighboring pixel may be three neighboring pixels having a smaller pixel value than the current pixel. Also, the index denotes a class index of a current pixel, and a normalization factor denotes a parameter for adjusting a size of the index value.

The encoder/decoder may determine a class of the current pixel using the index derived by Equation 2 and perform filtering on the current pixel by adding an offset corresponding to the determined class to the current pixel.

In addition, the encoder may transmit, to the decoder, a flag indicating whether to apply the above-described peaked sample filtering method. When the peaked sample filtering method is applied, the encoder may transmit a corresponding offset value for each class of each category to the decoder. In addition, the encoder may determine the number of normalization factors and/or maximum classes during the encoding process and transmit the determined number of normalization factors and/or the maximum classes to the decoder.

FIG. 7 is a flowchart illustrating a method of performing filtering on a peaked sample, as an embodiment to which the present invention is applied.

The peaked sample filtering method described in this embodiment may be similarly applied to an encoder and a decoder, and will be described with respect to the decoder for convenience of explanation.

The decoder determines whether peaked sample filtering is applied (S701). Whether peaked sample filtering is applied may be determined in a predetermined unit. For example, peaked sample filtering may be determined on a sequence, picture, slice, CTU, or coded block basis.

The encoder may determine whether to apply peaked sample filtering and perform signaling to the decoder. In other words, the encoder may send a filtering flag indicating whether peaked sample filtering is applied, to the decoder.

The decoder may parse the filtering flag to determine whether peaked sample filtering is applied. In this case, a step of parsing the filtering flag indicating whether peaked sample filtering is applied may be added before step S701.

If it is determined in step S701 that the peaked sample filtering is applied, the decoder calculates a category of the current pixel (S702). The peaked sample filtering may be performed on a pixel-by-pixel basis. The decoder may calculate the category of the current pixel using Equation 1 described above.

The decoder calculates the class of the current pixel (S703). In this case, the decoder may calculate a class of the current pixel using Equation 2 described above. As described above, the number of classes for each category or normalization factors may be used to calculate a class. The encoder may determine the optimal number of classes for each category and/or the optimal normalization factor in consideration of an error of the reconstructed image, coding efficiency, etc., and transmit the same to the decoder. In this case, a step of parsing the number of classes per category and/or parsing the normalization factors may be added before step S701. The number of classes and/or the normalization factors may be signaled from the encoder on a sequence, picture, slice, CTU or coded block basis.

The decoder adds the offset to the pixel value of the current pixel based on the calculated category and class (S704).

The encoder may determine the offset for each class of the category in consideration of the error of the reconstructed image, the coding efficiency, etc., and transmit the determined offset to the decoder. The offset may be transmitted on a sequence, picture, slice, CTU, or coding block basis. In this case, a step of parsing the offset for each class of each category may be added before step S701.

Embodiment 2

In an embodiment of the present invention, the encoder/decoder may filter the peaked samples using neighboring samples in all directions. Specifically, the encoder/decoder may determine a category of the current pixel using a difference value between the eight neighboring pixels and the current pixel.

FIG. 8 is a diagram illustrating neighboring pixels used for performing filtering, as an embodiment to which the present invention is applied.

The encoder/decoder may calculate a category of a current pixel 801 using an upper neighboring pixel NP (0, −1) 802, an upper left neighboring pixel NP (−1,−1) 803, a left neighboring pixel NP (−1,0) 804, a lower left neighboring pixel NP (−1,1) 805, a lower neighboring pixel NP (0,1) 806, a lower right neighboring pixel NP (1,1) 807, a right neighboring pixel NP (1,0) 808, and an upper right neighboring pixel NP (1,−1) 809.

For example, the encoder/decoder may calculate a category of the current pixel 801 using Equation 3 below.

Cat. 1: if number of adjacent $NP(x,y)>CP$ is equal to 3

Cat. 1: if number of adjacent $NP(x,y)<CP$ is equal to 3

Cat. 2: if number of adjacent $NP(x,y)>CP$ is equal to 4

Cat. 2: if number of adjacent $NP(x,y)<CP$ is equal to 4

Cat. 3: if number of adjacent $NP(x,y)>CP$ is equal to 5

Cat. 3: if number of adjacent $NP(x,y)<CP$ is equal to 5

Cat. 4: if number of adjacent $NP(x,y)>CP$ is equal to 6

Cat. 4: if number of adjacent $NP(x,y)<CP$ is equal to 6

Cat. 5: if number of adjacent $NP(x,y)>CP$ is equal to 7

Cat. 5: if number of adjacent $NP(x,y)<CP$ is equal to 7

Cat. 6: if number of adjacent $NP(x,y)>CP$ is equal to 8

Cat. 6: if number of adjacent $NP(x,y)<CP$ is equal to 8

Cat. 7: another  [Equation 3]

Referring to Equation 3, the category of the current pixel 601 may be calculated from category 1 to category 7 based on the number of neighboring pixels that are smaller or larger than the current pixel 801.

Except for the category determination, the peaked sample filtering in this embodiment may be performed in the same manner as that described in embodiment 1.

In an embodiment of the present invention, the encoder/decoder may classify the seven categories on the basis of the number of neighboring pixels different from the current pixel to improve complexity.

FIG. 9 is a view illustrating a method of determining a category using neighboring samples, as an embodiment of the present invention is applied.

Referring to FIG. 9, the encoder/decoder may preset conditions (or the number of cases) corresponding to each category in order to quickly determine a category. Since a category of the current pixel may be determined without comparing pixel values between the current pixel and neighboring pixels in all directions using Equation 3, computational complexity may be reduced and compression efficiency may be increased.

When the conditions illustrated in FIG. 9 are met, the encoder/decoder may determine the corresponding category as a category of the current pixel. If the conditions corresponding to the category 1 to 6 are not met, the category of the current pixel may be determined as category 7.

FIGS. 9(a), 9(b), 9(c), 9(d), 9(e) and 9(f) illustrate conditions corresponding to categories 1 to 6, respectively. The encoder/decoder may determine which category the current pixel corresponds to on the basis of the number and locations of neighboring pixels having pixel values different from the current pixel.

After determining the category of each pixel, the encoder/decoder may determine a class of each pixel using Equation 2 described above. Also, the encoder/decoder may add an offset corresponding to the class of the current pixel among the offsets transmitted for each class to the current pixel.

Embodiment 3

In an embodiment of the present invention, the encoder/decoder may derive an offset used for peaked sample filtering. In other words, the decoder may derive an offset in the process of filtering the peaked sample, without receiving it from the encoder.

The encoder/decoder may determine a category using the method proposed in embodiment 1 or 2. Also, the encoder/decoder may derive an offset without class distinction. If an offset is derived for each class as in Embodiment 1 and Embodiment 2 described above, a maximum of 1024 offset transmissions may be required for each category based on a 10-bit image and overhead may be large. In order to avoid this problem, in the above embodiments, the maximum number of classes is transmitted. Meanwhile, in the present embodiment, the encoder/decoder may derive the offset without transmitting it.

In an embodiment of the present invention, the encoder/decoder may calculate the offset using Equation 4 below.

$$\text{offset} = \left( \sum_{x=0}^{m-1} \frac{\text{abs}(NP(x) - CP)}{m} \right) \gg 1 \qquad \text{[Equation 4]}$$

Here, n denotes the number of selected neighboring pixels, and NP(x) denotes a selected neighboring pixel.

Referring to Equation 4, the offset is an average of the sum of difference values between the current pixel and the selected neighboring pixel.

According to this embodiment, since separate classification is not required, there is no need to calculate a class index and transmission of the maximum number of classes and normalization factors is not required.

Embodiment 4

As described above, in the SAO, an offset for each class of the category is transmitted. In the case of peaked sample filtering, related information is transmitted as described in Embodiment 1. However, the peaked sample filtering method and the SAO method basically have a common point in that an offset is added based on neighboring sample information.

Therefore, an embodiment of the present invention proposes a method considering both the sample adaptive offset (SAO) and the peaked sample filtering method.

In the present embodiment, the peaked sample filtering method described in Embodiment 1 will be described for convenience of explanation, but the method proposed in this embodiment may also be applied by combining the methods proposed in Embodiment 2 or Embodiment 3.

In an embodiment, the encoder/decoder may calculate a category of the current pixel using Equation 5 below.

if $\Sigma_{x=0}^{3}(CP>NP(x))$ equal to 3 then Category 1 if $\Sigma_{x=0}^{3}(CP<NP(x))$ equal to 3 then Category 1 if $\Sigma_{x=0}^{3}(CP>NP(x))$ equal to 4 then Category 2 if $\Sigma_{x=0}^{3}(CP<NP(x))$ equal to 4 then Category 2 otherwise: Sample Adaptive Offset  [Equation 1]

Referring to Equation 5, the encoder/decoder may calculate the category of the current pixel using the left, upper, lower, and right neighboring pixels of the current pixel as described above with reference to FIG. 5. Here, the category of the current pixel may be determined for category 1 and category 2 in the same manner as that of Equation 1.

If the current pixel corresponds to category 1 or category 2, the encoder/decoder may apply peaked sample filtering to the current pixel. Otherwise (in the case of category 3), the encoder/decoder may apply SAO to the current pixel.

When an edge offset is applied as SAO, the encoder sends information regarding which class is used to the decoder. This will be described with reference to the accompanying drawings.

FIG. 10 is a view for explaining a class of an edge offset, as an embodiment to which the present invention is applied.

In SAO, a class refers to four types of three one-dimensional pixel patterns for classifying pixels based on the edge direction of each pixel.

FIG. 10(a) shows a horizontal class, FIG. 10(b) shows a vertical class, FIG. 10(c) shows a 135° class, and FIG. 10(d) shows a 45° class. The encoder determines a specific class in which performance of an edge offset is maximized in consideration of the error of the reconstructed image, coding efficiency, and the like, and transmits the determined class information to the decoder. Each class is categorized according to the conditions in Table 1 below.

TABLE 1

|  | Condition | process |
| --- | --- | --- |
| Cat. 1 | c > a && c > b | +offset 1 |
| Cat. 2 | (c < a && c == b) \|\| (c == a && c < b) | +offset 2 |
| Cat. 3 | (c > a && c == b) \|\| (c == a && c > b) | +offset 3 |
| Cat. 4 | c > a && c > b | +offset 4 |
| Cat. 5 | otherwise | No smoothing |

The encoder/decoder calculates a category on a pixel-by-pixel basis using Table 1 above. Here, neighboring pixels used for calculating a category according to classes are determined as described above. In other words, a, b, and c in the condition of Table 1 represent positions of pixels per class illustrated in FIG. 10.

The decoder may perform SAO by calculating a category on a pixel-by-pixel basis and adding an offset value received from the encoder corresponding to the category to the corresponding reconstructed pixel.

The offset used in Table 1 may be transmitted from the encoder to the decoder. The offset may be transmitted in units of blocks to which SAO is applied, or may be transmitted in a high-level syntax.

In an embodiment of the present invention, the encoder/decoder may share an offset to perform SAO with peaked sample filtering. That is, the decoder may use the offset received from the encoder to apply peaked sample filtering or to apply SAO. This may reduce offset-related data signaled from the encoder to the decoder and increase coding efficiency.

FIG. 11 is a flowchart for explaining a method of performing filtering on a peaked sample, as an embodiment to which the present invention is applied.

The peaked sample filtering method described in this embodiment may be similarly applied to an encoder and a decoder, and will be described with reference to the decoder for convenience of explanation.

The decoder determines whether peaked sample filtering is applied (S1101). Whether peaked sample filtering is applied may be determined in a predetermined unit. For example, peaked sample filtering may be determined on a sequence, picture, slice, CTU, or coded block basis.

The encoder may determine whether to apply peaked sample filtering and perform signaling to the decoder. In other words, the encoder may send a filtering flag indicating whether peaked sample filtering is applied, to the decoder. The decoder may parse the filtering flag to determine whether peaked sample filtering is applied. In this case, a step of parsing the filtering flag indicating whether peaked sample filtering is applied may be added before step S1101.

If it is determined in step S1101 that the peaked sample filtering is applied, the decoder calculates a category of the current pixel (S1102). The peaked sample filtering may be performed on a pixel-by-pixel basis. The decoder may calculate the category of the current pixel using Equation 5 described above.

The decoder determines whether peaked sample filtering is applied to the current pixel based on the category calculated in step S1102 (S1103). As described above, in the case of category 1 and category 2, peaked sample filtering is applied, and in other cases, peaked sample filtering may not be applied.

If peak sampling filtering is applied to the category of the current pixel as a result of the determination in step S1103, the decoder calculates the class of the current pixel (S1104). In this case, the decoder may calculate a class of the current pixel using Equation 2 described above. As described above, the number of classes for each category or normalization factors may be used to calculate a class. The encoder may determine the optimal number of classes for each category and/or the optimal normalization factor in consideration of an error of the reconstructed image, coding efficiency, etc., and transmit the same to the decoder. In this case, a step of parsing the number of classes per category and/or parsing the normalization factors may be added before step S1101. The number of classes and/or the normalization factors may be signaled from the encoder on a sequence, picture, slice, CTU or coded block basis.

The decoder adds the offset to the pixel value of the current pixel based on the calculated category and class (S1105).

The encoder may determine the offset for each class of the category in consideration of the error of the reconstructed image, the coding efficiency, etc., and transmit the determined offset to the decoder. The offset may be transmitted on a sequence, picture, slice, CTU, or coding block basis. In this case, a step of parsing the offset for each class of each category may be added before step S1101.

If it is determined in step S1103 that peaked sample filtering is not applied to the current pixel category, the decoder applies SAO to the current pixel (S1106). Here, the SAO may be applied in the same manner as the SAO of the HEVC described above.

FIG. 12 is a view illustrating an image processing method according to an embodiment of the present invention.

Referring to FIG. 12, the decoder extracts encoded image data from a bitstream received from the encoder (S1201) and decodes the extracted encoded image data to generate a reconstructed image (S1202).

That is, the methods described in embodiment 1 to embodiment 4 may be applied to the reconstructed image. In addition, the methods described in embodiment 1 to embodiment 4 may be applied to a reconstructed image to which deblocking filtering is applied.

The decoder determines a category of a current pixel by comparing a pixel value of the current pixel in the reconstructed image with pixel values of neighboring pixels of the current pixel (S1203).

As described in the above embodiment 1, the decoder may determine a category of the current pixel using the number of neighboring pixels having a pixel value greater than the current pixel or the number of neighboring pixels having a pixel value smaller than the current pixel. Also, the may determine a category of the current pixel using the pixels adjacent to the left, upper, right, or lower sides of the current pixel.

Further, as described above in embodiment 2, the decoder may determine a category of the current pixel suing pixels adjacent to the left side, upper side, right side, lower side, upper left side, lower left side, upper lower side, or upper right side of the current pixel.

The decoder determines an offset applied to the current pixel based on a difference value between the pixel values of the pixels determined according to the category among the neighboring pixels and the pixel value of the current pixel (S1204).

The category may include a plurality of classes. Also, the encoder may transmit an offset corresponding to each class of the category.

As described above, the decoder may calculate a class index indicating a specific class in the category of the current pixel. Here, as described in Equation 2, the decoder may calculate a class index of the current pixel by using the sum of the difference values between the pixel values of the pixels (i.e., selected pixels) determined according to the category and the pixel value of the current pixel. The decoder may determine an offset applied to the current pixel using the class index.

Also, as described above in embodiment 3, the decoder may derive an offset. In this case, the decoder may determined the offset applied to the current pixel using an average of the difference values between the pixel values of the pixels determined according to the category and the pixel value of the current pixel.

In addition, as described above in embodiment 4, the decoder may apply a sample adaptive offset (SAO) without applying peaked sample filtering for a specific category.

The decoder compensates (or filters) the current pixel by adding the offset to the pixel value of the current pixel (S1205). Accordingly, the decoder may smooth the peaked sample.

FIG. 13 is a view illustrating an image processing device according to an embodiment of the present invention.

Referring to FIG. 13, for convenience of description, an image data extracting unit 1301, a reconstructed image generating unit 1302, and a filtering unit (160; see FIG. 1, 240; see FIG. 2) are illustrated as a block, but the image data extracting unit 1301, the reconstructed image generating unit 1302, and the filtering unit may be implemented as components included in the decoder.

The image data extracting unit 1301, the reconstructed image generating unit 1302, and the filtering unit implement the functions, processes, and/or methods proposed in FIGS. 5 to 12. Specifically, the filtering unit may include a category determining unit 1303, an offset determining unit 1304, and a pixel compensating unit 1305.

The specific components of the decoder illustrated in FIG. 13 is merely an example, and some of the specific components of the decoder illustrated in FIG. 13 may be included in other specific component and implemented together, and other components (not shown) may be added and implemented together.

The image data extracting unit 1301 extracts encoded image data from a bit stream received from the encoder, and the reconstructed image generating unit 1302 generates a reconstructed image by decoding the extracted encoded image data.

That is, the methods described in embodiment 1 to embodiment 4 may be applied to the reconstructed image. In addition, the methods described in embodiment 1 to embodiment 4 may be applied to a reconstructed image to which deblocking filtering is applied.

The category determining unit 1303 determines a category of the current pixel by comparing a pixel value of a current pixel in the reconstructed image with the pixel values of neighboring pixels of the current pixel.

As described above in embodiment 1, the category determining unit 1303 may determine the category of the current pixel by using the number of neighboring pixels having a pixel value greater than the current pixel or the number of neighboring pixels having a pixel value smaller than the current pixel. Also, the decoder may determine the category of the current pixel using the pixels adjacent to the left, upper, right or lower side of the current pixel.

Further, as described above in embodiment 2, the category determining unit 1303 may determine the category of the current pixel using pixels adjacent to the left, upper, right, lower, upper left, lower left, lower right, or upper right sides of the current pixel.

The offset determining unit 1304 determines an offset applied to the current pixel based on difference values between pixel values of pixels determined according to the category among the neighboring pixels and a pixel value of the current pixel.

The category may include a plurality of classes. Also, the encoder may transmit an offset corresponding to each class of the category.

As described above, the offset determining unit 1304 may calculate a class index indicating a specific class in the category of the current pixel. Here, as described in Equation 2, the offset determining unit 1304 may calculate a class index of the current pixel by using the sum of the difference values between the pixel values of the pixels (i.e., selected pixels) determined according to the category and the pixel value of the current pixel. The offset determining unit 1304 may determine an offset applied to the current pixel using the class index.

Also, as described in embodiment 3, the offset determining unit 1304 may derive an offset. In this case, as described above in Equation 4, the offset determining unit 1304 may determine the offset applied to the current pixel by using an average of the difference values between the pixel values of the pixels determined according to the category and the pixel value of the current pixel.

As described in embodiment 4, the offset determining unit 1304 may apply an SAO, rather than peaked sample filtering. for a specific category.

The pixel compensating unit 1305 compensates (or filters) the current pixel by adding the offset to the pixel value of the current pixel. Accordingly, the decoder may smooth the peaked sample.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The preferred embodiments of the present invention described above are disclosed for an exemplary purpose, and modifications, changes, substitutions, or additions of various other embodiments may be hereinafter made by those skilled in the art within the technical spirit and the technical scope of the present invention disclosed in the appended claims.

The invention claimed is:

1. A method for processing an image, the method comprising:
   extracting, by a processor, encoded image data from a bit stream received from an encoder;
   decoding, by the processor, the encoded image data to generate a reconstructed image;
   determining, by the processor, a category of a current pixel by comparing a pixel value of the current pixel in the reconstructed image with magnitudes of pixel values of 4 or more neighboring pixels of the current pixel,
   the category of the current pixel is determined only based on the number of neighboring pixels having a pixel value greater than the current pixel or the number of neighboring pixels having a pixel value smaller than the current pixel, among the 4 or more neighboring pixels of the current pixel;
   calculating, by the processor, a class index based on sum of difference values between pixel values of pixels determined according to the category, among the neighboring pixels, and the pixel value of the current pixel;
   determining, by the processor, a class of the current pixel among a plurality of classes included in the category based on the class index; and
   compensating, by the processor, for the current pixel by adding an offset corresponding to the class to the pixel value of the current pixel.

2. The method of claim 1, wherein
   the 4 or more neighboring pixels of the current pixel include pixels adjacent to the left side, upper side, right side, or lower side of the current pixel.

3. The method of claim 1, wherein
   the 4 or more neighboring pixels of the current pixel include pixels of the left side, upper side, right side, lower side, upper left side, lower left side, lower right side, or upper right side of the current pixel.

4. The method of claim 1, further comprising:
   parsing, by the processor, a corresponding offset for each class of the category from the bit stream.

5. The method of claim 1, wherein
   the calculating the class index further comprising:
   performing normalization on the class index based on a normalization parameter received from the encoder.

6. The method of claim 5, further comprising
   transmitting, by the processor, the normalization parameter in a slice header, a picture parameter set (PPS), a sequence parameter set (SPS), or a video parameter set (VPS).

7. The method of claim 1, further comprising:
   performing, by the processor, sample adaptive offset (SAO) on the current pixel when the category of the current pixel is included in a group to which the SAO is applied.

8. A device for processing an image, the device comprising:
   a memory; and
   a processor configured for:
   extracting encoded image data from a bit stream received from an encoder;
   decoding the encoded image data to generate a reconstructed image;
   determining a category of a current pixel by comparing a pixel value of the current pixel in the reconstructed image with magnitudes of pixel values of 4 or more neighboring pixels of the current pixel,
   the category of the current pixel is determined only based on the number of neighboring pixels having a pixel value greater than the current pixel or the number of neighboring pixels having a pixel value smaller than the current pixel, among the 4 or more neighboring pixels of the current pixel;
   calculating a class index based on sum of difference values between pixel values of pixels determined according to the category, among the neighboring pixels, and the pixel value of the current pixel;
   determining a class of the current pixel among a plurality of classes included in the category based on the class index; and
   compensating for the current pixel by adding an offset corresponding to the class to the pixel value of the current pixel.

9. A non-transitory decoder-readable storage medium for storing a bitstream generated by an encoder, the bitstream comprising:
   information used for decoding encoded image data to generate a reconstructed image;
   information used for comparing a pixel value of the current pixel in the reconstructed image with magnitudes of pixel values of 4 or more neighboring pixels of the current pixel to determine a category of a current pixel, the category of the current pixel is determined only based on the number of neighboring pixels having a pixel value greater than the current pixel or the number of neighboring pixels having a pixel value smaller than the current pixel, among the 4 or more neighboring pixels of the current pixel;

information used for calculating a class index based on sum of difference values between pixel values of pixels determined according to the category, among the neighboring pixels, and the pixel value of the current pixel;

information used for determining a class of the current pixel among a plurality of classes included in the category based on the class index; and information used for adding an offset corresponding to the class to the pixel value of the current pixel to compensate for the current pixel.

\* \* \* \* \*